Patented July 20, 1948

2,445,379

UNITED STATES PATENT OFFICE 2,445,379

POLYMERIZING DIALKOXYDIOLEFINS AND ISOOLEFINS

David W. Young, Roselle, and Norman M. Elmore, Elizabeth, N. J., assignors to Standard Oil Development Company, a corporation of Delaware No Drawing. Application June 24, 1944, Serial No. 542,027

8 Claims. (Cl. 260—92.6)

This invention relates to low temperature interpolymers of an isoolefin and a substituted polyolefin; and relates especially to low temperature interpolymers of isobutylene with a dialkoxy substituted diolefin, polymerized by boron trifluoride.

It has been found possible to interpolymerize isobutylene and a wide range of polyolefins such as butadiene, isoprene, piperylene, dimethyl butadiene, and the like, by the application to mixtures of such olefins at temperatures ranging from 0° C. down to —164° C. of a catalyst in the form of aluminum chloride or other Friedel-Crafts type catalysts in solution in a low-freezing, non-complex forming solvent such as ethyl or methyl chloride or carbon disulfide, or the like. Friedel-Crafts type catalysts are, however, very easily poisoned in such manner as to arrest the polymerization reaction: particularly, these catalysts have been found to be extremely sensitive to and easily poisoned by oxygenated organic compounds such as the alcohols, aldehydes, ethers, organic acids, and the like. It is a well established procedure in this polymerization art to quench and destroy the polymerization catalysts by the application to the polymerization mixture of very small percentages of alcohols, ethers or other organic liquids.

According to the present invention, however, it is found that a dialkoxy substituted polyolefin such as 2,3-ethoxy butadiene, while it is as violently poisonous to aluminum chloride catalysts as any of the other oxygenated liquids, not only is non-poisonous to boron trifluoride as a catalyst, but acts to improve the activity of boron trifluoride as a catalyst, and permits of the making of a much higher molecular weight polymer than is ordinarily obtainable with boron trifluoride.

According to the present invention, substantial proportions of the dialkoxy substituted polyolefin are mixed with isobutylene and polymerized by the application thereto of boron trifluoride, either in solution or in gaseous form, to yield copolymers having molecular weights ranging from 25,000 or 30,000 up to values as high as 100,000 or even 150,000.

The exact mechanics of this reaction procedure are unknown, but there are some indications that a highly potent catalyst complex is formed between the dialkoxy substituted polyolefin and the boron trifluoride which conspicuously increases the potency and power of the boron trifluoride catalyst. The resulting polymers are reactive with sulfur and other substances in a curing reaction which is in some ways analogous to the vulcanization of rubber, to yield a very valuable structural material. Other objects and details of the invention will be apparent from the following description:

In practicing the invention, the primary raw material is isobutylene, preferably of 96% to 99% purity. The second component of the polymerization mixture is a dialkoxy substituted polyolefin of which the lowest member in the series is 2,3-methoxy butadiene having the following formula:

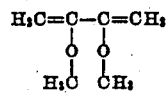

This substance is representative of a considerable number of analogous substances having the general formula

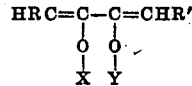

in which "R" and "R'" may be hydrogen or hydrogen-containing substituents, either alkyl, aryl or alicyclic, and "X" and "Y" may be alkyl radicals up to 6 or 8 carbon atoms. In these compounds the preferred positions for the alkoxy substituents are on the 2 and 3 carbons of the butadiene type structure. Second choice is for the alkoxy substituents on the 2 and 4 positions: and the third choice is for the alkoxy substituents on the 1 and 4 positions.

These two components, an isoolefin and an alkoxy substituted polyolefin are preferably used in a mixture containing a major proportion of isobutylene and a minor proportion of the substituted polyolefin: but this is not necessary, and the range of proportions may be from approximately 1–5 parts of isobutylene with 99–95 parts of the diolefin, down to 99.5 parts of isobutylene to 0.5 part of the polyolefin.

The alkoxy substituted butadienes may be polymerized alone, without the admixture of the isoolefin, and when so polymerized, they yield important and valuable substances. However, the molecular weight of the resulting polymer of the alkoxy substituted butadienes alone is considerably lower than the obtainable molecular weight of the mixture of isobutylene and the alkoxy substituted butadiene. The obtainable molecular weight is to a considerable extent dependent upon the lowness of the temperature, lower temperatures being conducive to higher molecular weights.

The mixture of isoolefin and substituted polyolefin (or substituted polyolefin alone) is cooled to a temperature within the range between 0° C. and −164° C., preferably to a temperature within the range between −40° C. and −103° C. The cooling may be accomplished by a refrigerating jacket upon the reaction container, in which case any convenient refrigerant is suitable, or it may be accomplished by the addition of a diluent or diluent refrigerant to the olefinic material, in which case such substances as liquid propane, liquid ethane, liquid ethylene or liquid methane are satisfactory; as well as liquid or solid carbon dioxide. Of these refrigerants, the carbon dioxide and the liquid ethane or liquid ethylene are preferred, both because they give lower temperatures and because they are relatively free from dilution effects upon the progress of the reaction.

The polymerization catalyst is boron trifluoride, which may be added to the reaction mixture at the desired temperature by bubbling the gas through the reaction mixture. This procedure is particularly effective at temperatures from about −100° C. to the upper temperature limit. Alternatively, boron trifluoride may be dissolved in a convenient solvent which is non-reactive therewith. Liquid ethane, liquid propane and liquid ethylene, carbon disulfide, methyl chloride, ethyl chloride, etc., are particularly satisfactory as solvents for the boron trifluoride; and these solvents are preferred at temperatures below −100° C., since boron trifluoride liquefies at −101° C. and the catalyst activity tends to be sharply reduced.

Upon the addition of the boron trifluoride catalyst, the reaction occurs at very high speed to yield a solid copolymer having molecular weights within the range between 10,000, 15,000 or 20,000 up to 100,000 or 150,000 and iodine numbers ranging from a fraction of 1 up to 40 or 50. The preferred molecular range is from 25,000 to about 80,000, and the preferred iodine number range is from about 1 to 9 or 10. It may be noted that if 10% or 20% to 30% of the diolefin is present, the hydrocarbon solubility of the polymer is definitely reduced.

The resulting polymer is reactive with sulfur, especially in the presence of a sulfurization aid such as tetramethyl thiuram disulfide "Tuads") or mercapto benzo thiazole "Captax"). In addition, the polymer is reactive with paraquinone dioxime and the dinitroso compounds in an analogous curing reaction. When cured, the polymer shows tensile strengths ranging from 1000 to 4500 pounds per square inch at break, with elongation at break ranging from 400–1200%. The polymer also shows an excellent flexure resistance, an excellent abrasion resistance, and good resistance to organic compounds generally; being wholly resistant to aqueous acid alkali and salt solutions, and resistant to all of the oxygenated organic liquids. The polymer is not resistant to elemental halides but forms substitution products therewith.

The alkoxy substituted polyolefins may also be copolymerized with many other substances such as the various styrene type components. Mixtures in various proportions of styrene with alkoxy substituted polyolefins are readily prepared since they are mutually soluble, and at temperatures ranging from about 0° C. down to about −164° C. a rapid and effective copolymerization is readily obtained, to yield more or less "leathery" resins, depending upon the relative proportions of the components and the lowness of the temperature, a polymer high in styrene tending towards brittleness and good strength, a resin high in alkoxy substituted polyolefin tending towards softness and plasticity. For this reaction, the preferred catalyst is boron trifluoride dissolved in methyl chloride, although aluminum chloride and other aluminum salts in solution in ethyl or methyl chloride or carbon disulfide are also effective and efficient catalysts. The dialkoxy polyolefins may also be copolymerized with other reactive materials containing an ethylenic linkage for example, methyl acrylate, p-bromostyrene, styrene, vinyl chloride, tri-isobutylene and etc. by mass, emulsion or dispersion techniques to give copolymers.

Similarly, three component polymers of isobutylene and similar isoolefins with styrene and its analogs and homologs and the alkoxy substituted polyolefins are likewise readily prepared. These compounds also show interestingly modified properties in comparison to the resins prepared from the pure single substances.

EXAMPLE 1

A mixture was prepared consisting of 300 parts by weight of liquid ethylene, 97 parts by weight of liquid isobutylene having a purity of 99%, and 3 parts by weight of pure 2,3-diethoxy butadiene-1,3. This mixture had a temperature of approximately −101° C. To the mixture there was then added by bubbling from a bubble tube, approximately 1 part by weight of gaseous boron trifluoride. A very rapid reaction occurred, the total time for the addition of the boron trifluoride and completion of the polymerization being approximately 30 seconds. At close of the reaction, the polymer was removed from the reactor, brought up to room temperature, washed with water, dried and then compounded according to the following recipe:

*Recipe 1*

| | Parts |
|---|---|
| Polymer | 100 |
| Carbon black (Cabot #9) | 10 |
| Stearic acid | 3 |
| ZnO | 5 |
| Sulfur | 1.5 |
| "Tuads" (tetramethyl thiuram disulfide) | 1.0 |

Three separate portions of the reaction mixture were separately polymerized in three successive runs, and the properties of the resulting polymer before and after curing are shown in the following Table I:

*Table I*

| Run No. | Per cent Conversion | Mooney Viscosity @ 100° C. | Per cent Substituted Diolefin | Name of Substituted Diolefin | Tensile Elongation 30′ Cure | | Tensile Elongation 60′ Cure | |
|---|---|---|---|---|---|---|---|---|
| 1 | 72 | 65 | 3 | 2,3 diethoxy butadiene 1-3 | 3640 | 925 | 4060 | 825 |
| 2 | 44 | 45 | 3 | 2,3 dimethoxy butadiene 1-3 | 2720 | 980 | 2900 | 990 |
| 3 | 57 | 48 | 3 | ......do...... | 2840 | 1100 | 2900 | 990 |

The principal variant in these three runs was the rate of addition of the boron trifluoride and the percent conversion. It will be noted that the Mooney viscosity is lower with a lower percent conversion, and also the tensile strengths of the cured materials are lower at the lower percentages of conversion. It may be noted that the compounded portions were separated into two samples and cured respectively 30 minutes and 60 minutes at 307° F.

EXAMPLE 2

A mixture was prepared consisting of 300 parts by weight of liquid ethylene, 97 parts by weight of liquid isobutylene having a purity of 99%, and 3 parts by weight of pure 2,3 dimethoxy butadiene 1-3. This mixture had a temperature of approximately —101° C. To the mixture there was then added by bubbling from a bubble tube, approximately 1 part by weight of gaseous boron trifluoride. A very rapid reaction occurred, the total time for the addition of the boron trifluoride and completion of the polymerization being approximately one to two minutes. At the close of the reaction, the polymer was removed from the reactor, brought up to room temperature, washed with water, dried and then compounded according to the recipe used in Example 1. Test results are recorded in Table II:

Table II

| Run No. | Per cent Conversion | Mooney Viscosity @ 100° C. | Per cent Substituted Diolefin | Name of Substituted Diolefin | 30 minutes at 307° F. | |
|---|---|---|---|---|---|---|
| | | | | | Tensile, Lbs./Sq. In. | Elongation, Per cent |
| 1 | 64 | 63 | 3 | 2,3 dimethoxy butadiene 1-3 | 3170 | 875 |

A method for the preparation of these alkoxy substituted polyolefins is found in the article by Johnson, Jobling and Bodamer in the Journal of the American Chemical Society, Volume 63, pages 131-135 (1941). According to the process there disclosed, the desired substituted alkoxy polyolefin is prepared by treating the polyolefin with mercuric acetate, in solution in methyl or ethyl alcohol to give the meso and racemic forms of 2,3 dialkoxy 1,4 diacetoxy mercurialkanes. The alkoxy containing substituent is separated from the excess alcohol. In this step any of the lower polyolefins from 4 to 10 or 12 carbon atoms and any of the lower alcohols up to 6 or 8 carbon atoms may be used. These mercurialkanes are then treated with potassium iodide and iodine to remove the mercury and yield the corresponding meso and racemic forms of the 2,3 dialkoxy 1,4 diiodoalkanes. Dehydrohalogenation of these products yields the 2,3-dialkoxy-1,3 polyenes. The process is broadly applicable to substantially all of the lower polyolefins and the lower alcohols. In the claims the carbon atom range is given as 6 to 10 per molecule and is obtained by using dimethoxy butadiene for the 6 carbon atoms and diethoxy dimethyl butadiene for the 10 carbon atoms per molecule, the dimethyl butadiene being mentioned on the previous page as capable of reacting with ethyl alcohol to form this particular dialkoxy conjugated diolefin.

Thus, this invention provides a new and useful oxygen-containing polymer which is particularly easy to prepare and gives unusually good tensile strengths and elongations. Thus the material cured with 50 parts carbon black for 60 minutes at 307° F. gives 440 lbs. modulus at 300% elongation; and the cured material shows excellent abrasion resistance, good flexure resistance, and the like, utilizing as the raw material isobutylene and a dialkoxy substituted polyolefin, and boron trifluoride as the catalyst.

While there are above disclosed but a limited number of embodiments of the process and product of the invention, only such limitations be imposed on the appended claims as are stated therein or required by the prior art.

The invention claimed is:

1. A copolymer of isobutylene in the proportion of 5% to 99.5% and a dialkoxy conjugated diolefin having 6 to 10 carbon atoms per molecule in the proportion of 0.5% to 95%.

2. A copolymer of isobutylene in the proportion of 5% to 99.5% and a dialkoxy conjugated diolefin having 6 to 10 carbon atoms per molecule in the proportion of 0.5% to 95%, the said copolymer being characterized by a molecular weight within the range between 20,000 and 150,000; by an iodine number within the range from 1 to 50; and reactivity with sulfur in the curing reaction to produce a tensile strength in the cured polymer within the range between 1000 and 4500 pounds per square inch and an elongation at break within the range between 400% and 1200%.

3. A copolymer of 5 to 99.5% of isobutylene and 0.5 to 95% of 2,3 diethoxy butadiene 1,3.

4. A copolymer of 5 to 99.5% of isobutylene and 0.5 to 95% of 2,3 dimethoxy butadiene 1,3.

5. A process for preparing a copolymer which comprises preparing a mixture of 5% to 99.5% of isobutylene with 95% to 0.5% of a dialkoxy conjugated diolefin having 6 to 10 carbon atoms per molecule, cooling the mixture to a temperature within the range between 0° C. and —164° C. and thereafter polymerizing the cold mixture by the application thereto of boron trifluoride.

6. A process according to claim 5 wherein the dialkoxy diolefin is 2,3 dimethoxy butadiene 1,3.

7. A process according to claim 5 wherein the dialkoxy diolefin is 2,3 diethoxy butadiene 1,3.

8. A process according to claim 5 wherein the boron trifluoride is in $C_1$ to $C_2$ alkyl chloride solution.

DAVID W. YOUNG.
NORMAN M. ELMORE.

REFERENCES CITED

The following references are of record in the file of this patent:

UNITED STATES PATENTS

| Number | Name | Date |
|---|---|---|
| 2,189,529 | Carothers et al. | Feb. 6, 1940 |
| 2,344,085 | Halbig | Mar. 14, 1944 |

FOREIGN PATENTS

| Number | Country | Date |
|---|---|---|
| 513,521 | Great Britain | Oct. 16, 1939 |

OTHER REFERENCES

Johnson et al.: article in Jour. Am. Chem. Soc., vol. 63, pages 131 to 135 (1941).